United States Patent
Guyomarc'h et al.

(10) Patent No.: US 10,824,737 B1
(45) Date of Patent: Nov. 3, 2020

(54) PROTECTING DATA FROM BRUTE FORCE ATTACK

(71) Applicant: Assa Abloy AB, Stockholm (SE)

(72) Inventors: François-Eric Michel Guyomarc'h, Clermont l'Herault (FR); Francois Menard, Suresnes (FR)

(73) Assignee: ASSA ABLOY AB, Stockholm (SE)

( * ) Notice: Subject to any disclaimer, the term of this patent is extended or adjusted under 35 U.S.C. 154(b) by 228 days.

(21) Appl. No.: 15/901,433

(22) Filed: Feb. 21, 2018

Related U.S. Application Data

(60) Provisional application No. 62/461,956, filed on Feb. 22, 2017.

(51) Int. Cl.
| | |
|---|---|
| *G06F 21/60* | (2013.01) |
| *G06F 3/06* | (2006.01) |
| *H04L 9/32* | (2006.01) |
| *H04L 9/06* | (2006.01) |
| *H04L 9/08* | (2006.01) |
| *H04L 29/06* | (2006.01) |

(52) U.S. Cl.
CPC .......... *G06F 21/602* (2013.01); *G06F 3/0623* (2013.01); *H04L 9/0625* (2013.01); *H04L 9/0825* (2013.01); *H04L 9/0894* (2013.01); *H04L 9/3247* (2013.01); *H04L 63/08* (2013.01)

(58) Field of Classification Search
CPC ... G06F 21/602; G06F 3/0623; H04L 9/0825; H04L 9/0625; H04L 9/0894; H04L 9/3247; H04L 63/08
USPC ........................................................ 713/193
See application file for complete search history.

(56) References Cited

U.S. PATENT DOCUMENTS

| | | | |
|---|---|---|---|
| 5,623,546 A | 4/1997 | Hardy et al. | |
| 7,774,604 B2 * | 8/2010 | Lowe | H04L 9/3247 713/176 |

(Continued)

OTHER PUBLICATIONS

Eric Baize, "Split-value Cryptographic Authentication: Building Advanced Threat-Resistant Software," https://blogs.rsa.com/split-value-cryptographic-authentication-building-threat-resistant-software/, Oct. 10, 2012.

(Continued)

*Primary Examiner* — Aravind K Moorthy
(74) *Attorney, Agent, or Firm* — Schwegman Lundberg & Woessner, P.A.

(57) ABSTRACT

Securely storing data includes encrypting the data using a random key to provide obfuscated data, scrambling the obfuscated data to provide scrambled obfuscated data, generating a scramble schema indicating how to unscramble the scrambled obfuscated data, encrypting the scrambled obfuscated data to provide encrypted scrambled obfuscated data, splitting the scramble schema, and distributing separate portions of the scramble schema and separate portions of the encrypted scrambled obfuscated data to separate entities. The data may be private key data. Securely storing data may also include concatenating the random key on to the obfuscated data prior to scrambling the obfuscated data, wherein the random key is scrambled together with the obfuscated data. Scrambling the obfuscated data may use a Fisher Yates Shuffle mechanism. Securely storing data may also include generating and distributing a symmetric authentication key that is used to authenticate a first entity to a second entity.

18 Claims, 4 Drawing Sheets

(56) References Cited

U.S. PATENT DOCUMENTS

| | | | | |
|---|---|---|---|---|
| 8,015,214 | B2* | 9/2011 | Coker | G06F 16/289 |
| | | | | 707/802 |
| 9,276,771 | B1* | 3/2016 | Zhou | H04L 12/56 |
| 9,412,410 | B1* | 8/2016 | Bentley | G11B 20/10388 |
| 2002/0078416 | A1* | 6/2002 | Hoshizawa | G11B 20/18 |
| | | | | 714/756 |
| 2006/0095977 | A1* | 5/2006 | Nam | G06F 21/14 |
| | | | | 726/33 |
| 2007/0058540 | A1* | 3/2007 | Kay | H04L 49/00 |
| | | | | 370/230 |
| 2008/0077794 | A1* | 3/2008 | Arnold | H04L 9/0822 |
| | | | | 713/169 |
| 2008/0110982 | A1* | 5/2008 | Song | G06Q 30/0601 |
| | | | | 235/381 |
| 2008/0294895 | A1* | 11/2008 | Bodner | G06F 21/6218 |
| | | | | 713/168 |
| 2009/0034725 | A1* | 2/2009 | Davies, Sr. | H04L 63/08 |
| | | | | 380/255 |
| 2009/0083544 | A1* | 3/2009 | Scholnick | G06F 21/14 |
| | | | | 713/186 |
| 2009/0262925 | A1* | 10/2009 | Vijayarangan | H04L 9/0637 |
| | | | | 380/29 |
| 2010/0162352 | A1* | 6/2010 | Haga | G06F 21/51 |
| | | | | 726/2 |
| 2010/0268934 | A1* | 10/2010 | Hinton | H04L 63/0428 |
| | | | | 713/152 |
| 2011/0252480 | A1* | 10/2011 | Patawaran | H04L 67/1097 |
| | | | | 726/26 |
| 2011/0296165 | A1* | 12/2011 | Suginaka | G09C 1/02 |
| | | | | 713/150 |
| 2011/0320813 | A1* | 12/2011 | Suginaka | H04L 9/32 |
| | | | | 713/168 |
| 2012/0011165 | A1* | 1/2012 | Coker | G06F 21/6227 |
| | | | | 707/792 |
| 2012/0079288 | A1* | 3/2012 | Hars | G06F 21/00 |
| | | | | 713/193 |
| 2012/0314856 | A1* | 12/2012 | Zaverucha | H04L 9/3247 |
| | | | | 380/44 |
| 2013/0019096 | A1* | 1/2013 | Palzer | H04L 9/0827 |
| | | | | 713/168 |
| 2013/0042112 | A1* | 2/2013 | Spector | H04L 9/0847 |
| | | | | 713/171 |
| 2013/0097425 | A1* | 4/2013 | Almandos | H04L 9/3247 |
| | | | | 713/175 |
| 2014/0064487 | A1* | 3/2014 | Abraham | H04L 63/045 |
| | | | | 380/270 |
| 2015/0039900 | A1* | 2/2015 | Kawakami | G06F 21/52 |
| | | | | 713/187 |
| 2015/0089574 | A1* | 3/2015 | Mattsson | G06F 16/221 |
| | | | | 726/1 |
| 2015/0147994 | A1* | 5/2015 | Tsai | H04L 5/0073 |
| | | | | 455/296 |
| 2015/0207785 | A1* | 7/2015 | Sathaye | H04L 9/3215 |
| | | | | 713/168 |
| 2015/0350170 | A1* | 12/2015 | Roselle | H04W 12/06 |
| | | | | 713/171 |
| 2015/0379524 | A1* | 12/2015 | Loken | G06Q 30/0185 |
| | | | | 705/318 |
| 2016/0026808 | A1* | 1/2016 | Biskeborn | G06F 21/62 |
| | | | | 713/193 |
| 2016/0191853 | A1* | 6/2016 | Waisbard | H04N 21/4353 |
| | | | | 725/31 |
| 2016/0219024 | A1* | 7/2016 | Verzun | G06F 21/606 |
| 2016/0226846 | A1* | 8/2016 | Fu | H04L 63/062 |
| 2016/0294553 | A1* | 10/2016 | Hattori | H04L 9/14 |
| 2016/0315765 | A1* | 10/2016 | Zheng | G06F 12/1408 |
| 2017/0054875 | A1* | 2/2017 | Maruyama | H04N 1/00204 |
| 2017/0070481 | A1* | 3/2017 | Manko | H04L 63/0428 |
| 2017/0098090 | A1* | 4/2017 | Ali | G06F 40/10 |
| 2017/0104736 | A1* | 4/2017 | Seul | G06F 16/13 |
| 2017/0117014 | A1* | 4/2017 | Cideciyan | G11B 20/10009 |
| 2017/0147829 | A1* | 5/2017 | Cismas | G06F 21/6218 |
| 2018/0096560 | A1* | 4/2018 | Lee | G07F 17/3225 |
| 2018/0184461 | A1* | 6/2018 | Zhang | H04W 72/042 |
| 2019/0012468 | A1* | 1/2019 | Huang | G06F 16/29 |

OTHER PUBLICATIONS

Clifford Cocks, "Split Knowledge Generation of RSA Parameters," https://www.gchq.gov.uk/sites/default/files/document_files/rsa.pdf.
TheINQUIRER, "HP brings simple split-key encryption to the cloud," https://web.archive.org/...60624000110/http://www.theinquirer.net/inquirer/news/2349351/hp-brings-simple-split-key-encryption-to-the-cloud.
Intuit, "Homomorphic Key Management," http://www.porticor.com/homomorphic-encryption/.
Gilad Parann-Nissany, "Your Customers Are Concerned about PCI and HIPAA Compliance; Shouldn't You Be?," Portico Cloud Security, http://www.porticor.com/tag/split-key-encryption/, Nov. 6, 2013.

* cited by examiner

PROTECTING DATA FROM BRUTE FORCE ATTACK

CROSS-REFERENCE TO RELATED APPLICATIONS

This application claims priority to U.S. Prov. App. No. 62/461,956, filed on Feb. 22, 2017, and entitled "PROTECTING RSA AND ECC KEYS FROM BRUTE FORCE ATTACKS", which is incorporated herein by reference in its entirety.

BACKGROUND OF THE INVENTION

1. Technical Field

This application is related to the field of cryptography and more particularly to using cryptographic techniques and protocols to protect data stored in devices from brute force attacks.

2. Description of Related Art

Many cryptographic protocols rely on a user and/or a user device having a private key that may be used for decrypting, digital signing, etc. For example, in public key cryptography, a user keeps a private key that may be used to decrypt data that had been previously encrypted using a particular public key. Anyone with access to the public key can encrypt a message and send the encrypted message to the user, who then decrypts the message using the private key. Conversely, a user can digitally sign a message by encrypting data (e.g., a nonce) using the private key and then providing a clear text version of the data along with a version of the data that has been encrypted using the private key. A party receives the encrypted data and the clear text data and applies the public key to the encrypted version of the data. If the result of applying the public key matches the clear text version of the data, then the encrypted version of the data was encrypted using the private key.

The data being encrypted with the private key (digital signature) is proof that the encrypting party, in this case the user, possesses the private key. In a system where distribution of keys is regulated and authenticated, such as the Public Key Infrastructure (PKI), receiving data that has been digitally signed by a party with a particular private key is proof that the data originated with the party. In the PKI system, public keys are distributed to recipients using digital certificates that are themselves digitally signed by mutually-trusted parties called "Certificate Authorities". A user attempting to verify his or her identity could present to a third party a digital certificate indicating the user's public key (PK) and the identity of user. The user then also provides to the third party digitally signed data, where a clear text version of the data is possibly provided by the third party to prevent a replay attack (using old data from a previous transaction). The third party could then verify the digital signature with the user's public key and thus ensure that the data must have been digitally signed using the private key of the user.

Of course, the PKI system and similar systems depend upon only the user having the private key. If a malicious actor comes into possession of the private key of the user, the malicious actor can impersonate the user by digitally signing data using the private key in the same way that the user would digitally sign data using the private key. In such a case, the PKI system provides a mechanism for revoking digital certificates. However, the malicious actor can impersonate the user until the breach is discovered and the digital certificate of the user can be revoked. Thus, it is important that users safeguard their private keys to prevent the private keys from falling into the wrong hands. Note also that some systems do not provide a formal revocation mechanism at all so that loss of a private key is even more troublesome.

A difficulty with protecting private keys is that, in some cases, the private keys are stored in user devices such as mobile phones, laptops, etc. If a user device is obtained by a malicious actor (e.g., is stolen), the user device may be subject to an offline attack where the attacker is able to bypass most or all of the security protections of the device as well as security protections of the operating system. The attacker may then gain access to secret data including the private keys stored on the user device, which may then be used to impersonate the user, approve transactions on behalf of the user, or some other nefarious purpose. A possible mitigation against offline attacks that bypass security protections of a device is to encrypt each private key on the user device using a password derived key and to store only encrypted versions of the private key data on the user device. Since the password is known only by the user, in theory the private key data is not accessible to an attacker that has bypassed security protections of a user device. However, given current computer processing power, it may be possible for a malicious actor to attempt a brute force attack using many possible passwords under a reasonable timeframe. The malicious actor attempts to decrypt the private key by trying (possibly randomly) a number of passwords and then testing the result thereof using a known public key. That is, the malicious actor obtains an encrypted private key, pk', from a user device and then applies different possible passwords to attempt to find the corresponding private key, pk. The attacker can test each attempted password by testing if the result of applying the password to the encrypted private key provides a value that properly decrypts data that is encrypted with a known corresponding public key. The known public key provides a relatively easy mechanism to test possible passwords against an encrypted private key.

A proposed solution stores the private key on a user device in an encrypted format, but the user does not possess the required symmetric decryption key. Instead, the symmetric decryption key is held by a key escrow and/or a server and provided to a user device only after the user device authenticates to the key escrow/server. However, this solution suffers from the same deficiency as schemes in which the user can access the private key on the user device with a password since the attacker can still test a number of possible symmetric keys until a legitimate private key is produced. In other cases, the private key data may be split so that some bits of the private key data are provided on the user device and other bits of the private key data are provided on another device, such as a key escrow or a server. However, it has been found that keeping just a subset of the private key data bits on the user device may allow recovery of the entire private key data because of expected patterns of the data. For instance, in one example, researchers were able to recover the entirety of private key data starting with just 27% of the private key data bits.

Yet another proposed solution to this problem is to not store private keys on user devices but, instead, to store the private keys with an escrow agent, such as a secure server. However, having an entity other than the user of a private key store the private key on behalf of the user creates a different problem in which the user can repudiate any transaction that is purportedly signed by the user by claiming that it was the escrow agent, and not the user, that digitally signed the transaction. For example, if a broker receives instructions in a message signed by the user's private key, and the transaction results in a loss for the user, the user could attempt to deny being the source of the instructions and thus refuse to cover the loss. Thus, it is important that only the user have control over a private key so that the user is not in a position to repudiate his or her transactions that are digitally signed using the private key.

Accordingly, it is desirable to provide a system that protects private keys from brute force attacks while preventing repudiation of messages signed using the private keys.

SUMMARY OF THE INVENTION

According to the system described herein, securely storing data includes obfuscating the data using a random key to provide obfuscated data, scrambling the obfuscated data to provide scrambled obfuscated data, generating a scramble schema indicating how to unscramble the scrambled obfuscated data, encrypting the scrambled obfuscated data to provide encrypted scrambled obfuscated data, splitting the scramble schema, and distributing separate portions of the scramble schema and separate portions of the encrypted scrambled obfuscated data to separate entities. The data may be private key data. Securely storing data may also include concatenating the random key on to the obfuscated data prior to scrambling the obfuscated data, wherein the random key is scrambled together with the obfuscated data. Scrambling the obfuscated data may use a Fisher Yates Shuffle mechanism. Splitting the scramble schema may use a random number and a first part of a portion of the scramble schema may be set equal to the random number and a second corresponding portion of the scramble schema may be set equal to the difference between the portion of the scramble schema and the random number. Securely storing data may also include generating and distributing a symmetric authentication key that is used to authenticate a first one of the entities to a second one of the entities. The first one of the entities may be a user device and the second one of the entities may be a key escrow. The user device may be a mobile phone, a tablet, a laptop computer, or a desktop computer. Encrypting the scrambled obfuscated data may use a secret entered by a user. The secret may be a password or a PIN.

According further to the system described herein, reconstructing data that has been distributed across separate entities includes authenticating a first one of the entities to a second one of the entities, in response to successfully authenticating the first one of the entities to the second one of the entities, transferring a portion of a scramble schema and a portion of encrypted scrambled obfuscated data from the second entity to the first entity, reconstructing the scramble schema using portions thereof, decrypting the encrypted scrambled obfuscated data to provide scrambled obfuscated data, unscrambling the scrambled obfuscated data using the scramble schema to provide obfuscated data, and decrypting the obfuscated data using a random key to provide reconstructed data. The particular data may be private key data. The random key may be concatenated on to the obfuscated data. The scrambled obfuscated data may be unscrambled using a Fisher Yates Shuffle mechanism. The scramble schema may be reconstructed by adding corresponding portions from different entities. A symmetric authentication key may be used to authenticate the first one of the entities to the second one of the entities. The first one of the entities may be a user device and the second one of the entities may be a key escrow. The user device may be a mobile phone, a tablet, a laptop computer, or a desktop computer. Decrypting the scrambled obfuscated data may use a secret entered by a user. The secret may be a password or a PIN.

According further to the system described herein, a user device for reconstructing data includes at least one processor coupled to a memory, the memory storing processor executable instructions that configure the at least one processor to authenticate the user device with a key escrow server, in response to successfully authenticating the user device with the key escrow server, cause the user device to request a first portion of a scramble schema and a first portion of encrypted scrambled obfuscated data from the key escrow server, reconstruct the scramble schema from the first portion of the scramble schema received from the key escrow server and a second portion of the scramble schema stored in the memory, reconstruct the encrypted scrambled obfuscated data from the first portion of encrypted scrambled obfuscated data received from the key escrow server and a second portion of encrypted scrambled obfuscated data stored in the memory, decrypt the encrypted scrambled obfuscated data to provide scrambled obfuscated data, unscramble the scrambled obfuscated data using the scramble schema to provide obfuscated data, and decrypt the obfuscated data using a random key to provide reconstructed data.

BRIEF DESCRIPTION OF DRAWINGS

Embodiments of the system are described with reference to the several FIG.'s of the drawings, noted as follows.

DETAILED DESCRIPTION OF VARIOUS EMBODIMENTS

Figure 1:
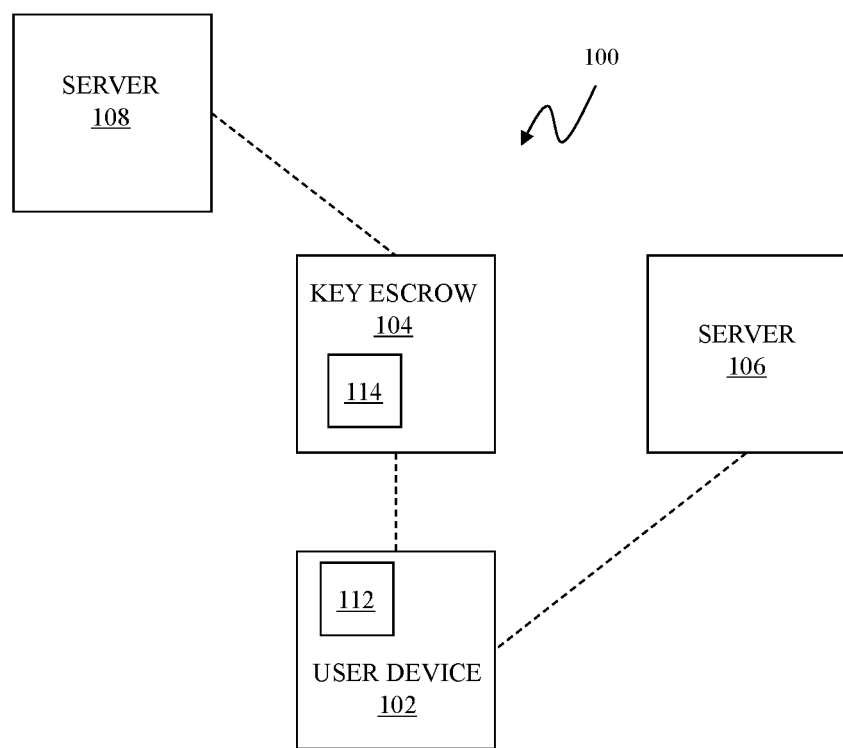
FIG. 1 is a schematic diagram illustrating a user device, a key escrow, a first server, and a second server according to an embodiment of the system described herein.

Referring to FIG. 1, a schematic diagram 100 illustrates a system having a user device 102, a key escrow 104, a first server 106 and a second server 108. The user device 102 could be any type of electronic device, such as a mobile phone (smart phone), a tablet, a laptop computer, a desktop computer, etc. The key escrow 104 may be a server that may be either co-located with the user device 102 or provided in a different geographic location. The user device 102 and the key escrow 104 may communicate using any appropriate communication mechanism, including secure protocols that use encrypted communications. A first portion 112 of scrambled encrypted private key data is provided on the user device 102 while a second portion 114 of the scrambled encrypted private key data is provided at the key escrow 104. The scrambled encrypted private key data and the portions 112, 114 are described in more detail elsewhere herein.

The first server 106 may be in communication with the user device 102 using, for example, the Internet, although other communication mechanisms are possible. The first server 106 and the user device 102 may exchange data in a transaction that requires the user device 102 to access the private key data of the user. For example, the first server 106 may be related to a brokerage house and the user device 102 may use the private key data to digitally sign a transaction request sent from the user device 102 to the first server 106. In such a case, the user device 102 coordinates with the key escrow 104 to construct the private key data using the portions 112, 114 and using a mechanism described in more detail elsewhere herein. The user device 102 then uses the private key data for the transaction with the server 106. After the transaction, the private key data is erased from the user device 102. The private key data may then be reconstructed again at the user device 102 for a future transaction. The private key data is not stored permanently at the user device 102 and thus is not subject to discovery by a malicious actor. Note, however, that there may be embodiments where, following the transaction, the private key data is cached temporarily in the user device 102 for a specified amount of time or under certain conditions. Temporarily caching the private key data in the user device 102 may enhance efficiency without appreciably decreasing security.

In some embodiments, where non-repudiation is not as important or possibly where the key escrow 104 acts as an agent for the user device 102 (e.g., the key escrow is provided on a corporate server in a company at which the user is employed), the key escrow 104 may be coupled to the second server 108 so that the key escrow 104 may participate in transactions between the user device 102 and the second server 108 and, in some cases, the private key data is constructed using the portions 112, 114 at the key escrow 104 rather than at the user device 102. For example, the second server 108 may be related to a brokerage house and the user may perform a transaction by transmitting a message to the second server 108 through the key escrow 104. In such a case it may be possible for the key escrow 104 to construct the private key data using the portions 112, 114 and then digitally sign the transaction request on behalf of the user device 102. In some embodiments, the key escrow 104 and the second server 108 may be co-located in the same geographic area or in the same server hardware (using, for example, separate virtual machines) or may even possibly be implemented in the same server. Note that, as described in more detail elsewhere herein, in some embodiments, a user must provide a secret (e.g., a PIN, a password, etc.) in order to construct the private key data using the portions 112, 114. Also note that, in some embodiments, one or both of the servers 106, 108 may not be present.

Figure 2:
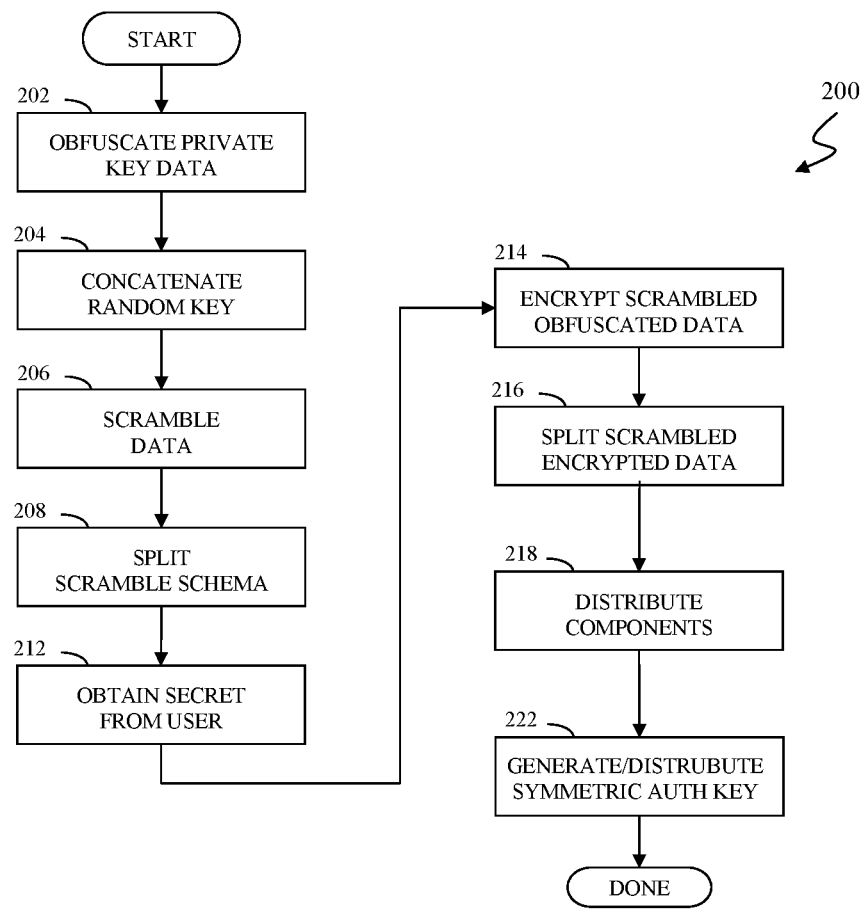
FIG. 2 is a flow diagram illustrating creating first and second parts of scrambled encrypted private key data according to an embodiment of the system described herein.

Referring to FIG. 2, a flow diagram 200 illustrates steps performed in connection with converting private key data into the scrambled encrypted private key and the portions 112, 114. The processing illustrated by the flow diagram 200 may be performed by the user device 102, at the key escrow 104, at remote device that is separate from the user device 102 and the key escrow 104, or at some combination thereof. Processing begins at a first step 202 where the private key data is obfuscated using, for example, a random key. Note that there are many possible mechanisms for obfuscating the private key data, including using an XOR operation. For example, at step 202 the private key data can be obfuscated by performing an XOR operation on the private key data with the random key. The random key can be repeating such that all bits of the private key are obfuscated during the XOR operation. In an embodiment herein, the device (e.g., the user device 102) performing the obfuscation (which is a form of encryption) generates a random number that is used as the random key for obfuscation. Of course, it is possible to generate the random key using any appropriate mechanism. The private key data is obfuscated to hide well-known values that can appear in the private key data, such as a public key part, an OID for ECC keys, etc. The well-known values may otherwise be used in a brute force attack to uncover the private key. The following illustrates the transformation at the step 202:

obfuscatedPrivateKeyData=Encrypt(privateKeyData) using RandomKey

Following the step 202 is a step 204 where the random key is concatenated to the end of the obfuscatedPrivateKeyData to provide a result, obfuscatedPrivateKeyDataRandomKey. The following illustrates the transformation at the step 204:

obfuscatedPrivateKeyDataRandomKey=concatenate (obfuscatedPrivateKeyData random key)

Following the step 204 is a step 206 where obfuscatedPrivateKeyDataRandomKey is scrambled to provide two quantities—the first quantity, scrambledObfuscatedKeys, and the second quantity, scrambleSchema. The first quantity, scrambledObfuscatedKeys, is a scrambled version of obfuscatedPrivateKeyDataRandomKey. The second quantity, scrambleSchema, describes how the data was scrambled (describes the transformation from obfuscatedPrivateKeyDataRandomKey to scrambledObfuscatedKeys).

In an embodiment herein the scrambling is performed using the Fisher Yates Shuffle mechanism, which is described in more detail elsewhere herein, and the scrambleSchema is a list of random values that were used for shuffling obfuscatedPrivateKeyDataRandomKey to obtain scrambledObfuscatedKeys. The scrambleSchema may not be encrypted. In an embodiment herein, the obfuscated private key data is scrambled with the random key (the obfuscated private key data and the random key are scrambled together). Scrambling obfuscatedPrivateKeyDataRandomKey may prevent an attacker from determining which byte belongs to which key component of the private key data, by making it more difficult (impossible or nearly impossible) to guess any bytes that are absent or to correlate between components of the private key data.

Following the step 206 is a step 208 where the scrambled schema is randomly split to provide a firstPartScrambleSchema and a secondPartScrambleSchema. Although any appropriate mechanism may be used to randomly split the scrambleSchema at the step 208, in an embodiment herein a specific mechanism is used, which is described in more detail elsewhere herein. Following the step 208 is a step 212 where a secret (e.g., a password, a PIN, etc.) is obtained from the user. The secret is used to generate a Password Based Key (PBK) or a Password Based Key Derivative Key (PBKDK) key, using, for example, known key derivation functions.

Following the step 212 is a step 214 where the PBK or PBKDK is used to encrypt scrambledObfuscatedKeys to provide scrambledEncryptedData. Following the step 214 is a step 216 where scrambledEncryptedData is split into a first part and a second part (e.g., first N bytes are first part and second N bytes are second part). Following the step 216 is a step 218 where the components (from the steps 208, 216) are distributed so that the user device 102 receives one of the firstPartScrambleSchema and secondPartScrambleSchema and one of the first and second parts of scrambledEncryptedData and the escrow agent 104 receives the remaining parts. Following the step 218, is a step 222 where a symmetric authentication key is generated and then distributed to both the user device 102 and the key escrow 104. In some embodiments, the symmetric authentication key may be encrypted using, for example, a PBKDK and the secret entered by the user, as described elsewhere herein. Use of the symmetric authentication key is discussed in more detail elsewhere herein. Following the step 222, processing is complete. Note that, as discussed in more detail elsewhere herein, a symmetric authentication key, like the key generated and distributed at the step 222, is exceptionally robust against brute force attacks. However, any other appropriate authentication mechanism may be used instead, which will be apparent from the discussion elsewhere herein regarding use of the symmetric authentication key.

Figure 3:
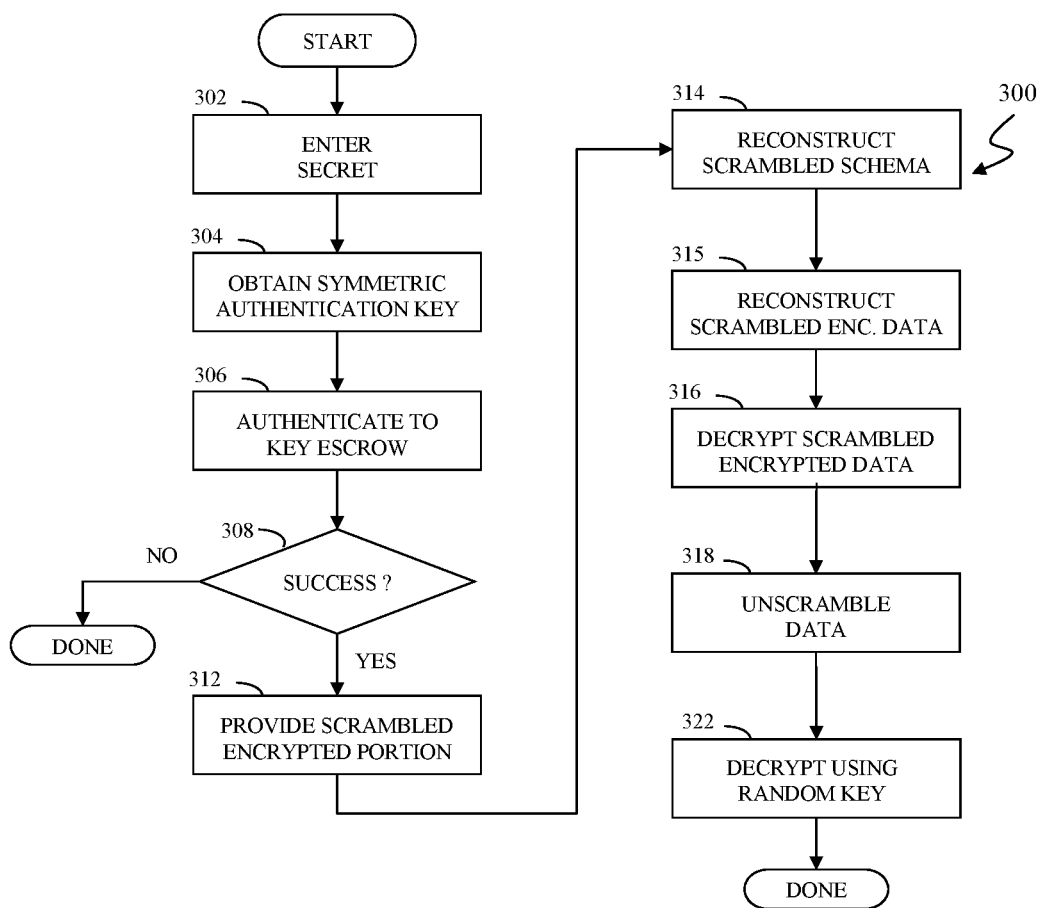
FIG. 3 is a flow diagram illustrating constructing private key data from first and second parts of scrambled encrypted private key data according to an embodiment of the system described herein.

Referring to FIG. 3, a flow diagram 300 illustrates steps performed in connection with constructing the private key data using the scrambled encrypted portions 112, 114. As discussed elsewhere herein, the private key data is constructed whenever the private key is needed. For example, if the user device 102 receives a message that has been encrypted using the public key of the user, the private key data may be constructed and then used to decrypt the message. The processing illustrated by the flow diagram 300 may be performed by the user device 102, at the key escrow 104, at remote device that is separate from the user device 102 and the key escrow 104, or at some combination thereof.

Processing for the flow diagram 300 begins at a first step 302 where the user enters the secret (initially provided at the step 212, described above). Following the step 302 is a step 304 where the device constructing the private key (e.g., the user device 102) obtains the symmetric authentication key (discussed above), which may require applying the PBKDK (or another mechanism) for decrypting the symmetric authentication key if the key had been previously encrypted. Following the step 304 is a step 306 where the user device 102 authenticates to the key escrow 104 using the symmetric authentication key. Following the step 306 is a test step 308 where it is determined if the user device 102 has successfully authenticated to the key escrow 104. Note that, if the symmetric authentication key had been previously encrypted using the secret from the user, then the symmetric authentication key can only be properly decrypted using the secret from the user. Thus, if a malicious actor provides an incorrect value instead of the secret, then the proper symmetric authentication key will not be obtained at the step 304 and the user device 102 will not be able to authenticate to the key escrow 104 at the step 306.

Symmetric keys may be used for authentication to protect against brute force attacks since, generally, symmetric keys have no underlying mathematical structure so an attacker is not able to identify if a key is correct; that is, a result provided by applying an incorrect key will appear, structurally, the same as a result provided by a correct key. An exception to this is symmetric DES keys which have parity bits and hence can be used as a hint to an attacker. However, it is known that most implementations ignore the parity bits so it is always possible to randomize the parity bits to remove a possibility of using the parity bits as a hint to an attacker. Alternatively, the use of AES Keys or other symmetric ciphers that do not have parity bits is a possibility. Also, symmetric keys may be protected against a padding Oracle attack by, for example, using no padding when the data to encrypt is a multiple of the cipher block length, using a cipher mode that does not require padding (streaming mode), using different ways of ending a message such as ciphertext stealing or residual block termination, etc.

If it is determined at the test step 308 that the user device 102 has not successfully authenticated to the key escrow 104, then processing is complete and the private key is not reconstructed from the portions 112, 114. In some embodiments, the user may be allowed a finite number of attempts (e.g., three), after which the user is prevented from further attempts for a pre-determined amount of time and/or until administrative intervention is provided. Alternatively, if it is determined at the test step 308 that the user device 102 has successfully authenticated to the key escrow 104, then processing proceeds to a step 312 where the key escrow 104 provides the scrambled encrypted portion 114 to the user device 102 (or vice versa in some embodiments, see discussion above). In this case, the scrambled encrypted portion 114 includes one of the firstPartScrambleSchema and secondPartScrambleSchema and one of the first and second parts of scrambledEncryptedData that were distributed to the key escrow 104 in connection with step 218.

Following the step 312 is a step 314 where the scrambledSchema (discussed above) is reconstructed using the firstPartScrambleSchema and the secondPartScrambleSchema obtained from each of the portions 112, 114 of the scrambled encrypted key data. Reconstruction at the step 314 is essentially the inverse of the mechanism used to initial split the scrambleSchema into two portions, discussed elsewhere herein. Following the step 314 is a step 315 where the scrambled encrypted data is reconstructed using the first and second parts of scrambledEncryptedData that had previously been split (see, for example, the step 216, above). Following the step 315 is a step 316 where the PBK or PBKDK (discussed elsewhere herein), which may be based on the user secret entered at the step 302, is used to decrypt scrambledEncryptedData to provide scrambledObfuscatedKeys. Following the step 316 is a step 318 where the scrambleSchema is used to unscramble scrambledObfuscatedKeys to provide obfuscatedPrivateKeyDataRandomKey (discussed above). Following the step 318 is a step 322 where the random key (discussed above) at the end of obfuscatedPrivateKeyDataRandomKey is used to decrypt obfuscatedPrivateKeyData to provide the private key data. Following the step 322, processing is complete.

Figure 4:
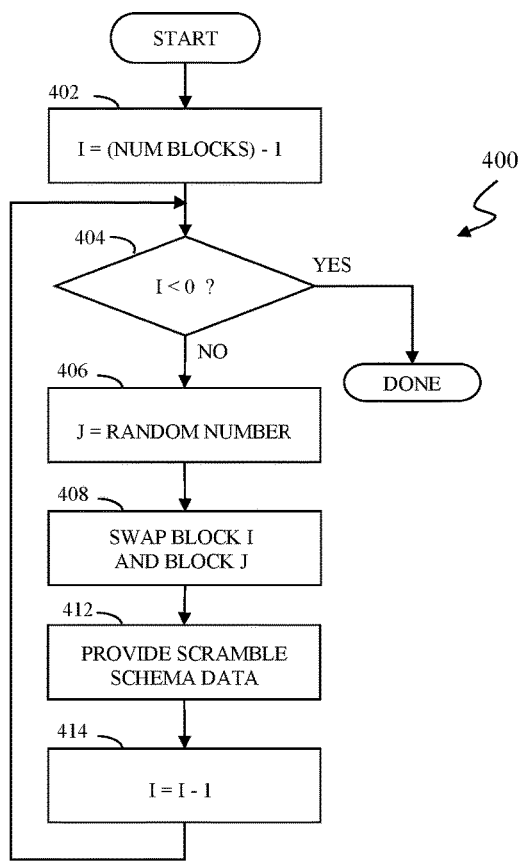
FIG. 4 is a flow diagram illustrating scrambling obfuscated private key data according to an embodiment of the system described herein.

Referring to FIG. 4, a flow diagram 400 illustrates a mechanism (Fisher Yates Shuffle mechanism) for scrambling the obfuscated private key data having the random key appended thereto (obfuscatedPrivateKeyDataRandomKey) at the step 206, discussed above. In an embodiment herein, the obfuscatedPrivateKeyDataRandomKey is subdivided into blocks, where each block is a single byte and scrambling the data consists of randomly swapping blocks (e.g., bytes). Of course, the mechanism illustrated by the flow diagram 400 is one of many possible mechanisms that could be used to scramble data. Similarly, the block size that is used could be different than a byte.

Processing begins at a first step 402 where a counter, i, is initialized to the number of blocks in obfuscatedPrivateKeyDataRandomKey minus one. Following the step 402 is a test step 404 where it is determined if the counter, i, is less than zero. If so, then processing is complete. Otherwise, control transfers from the test step 404 to a step 406 where a random number, j, is generated. In an embodiment herein, j is constrained to be an integer greater than or equal to zero and less than or equal to i. Following the step 406 is a step 408 where the ith block of obfuscatedPrivateKeyDataRandomKey is swapped with the jth block of obfuscatedPrivateKeyDataRandomKey. Following the step 408 is a step 412 where swap information for the swap that was performed at the step 408 is used to create scramble schema which, as discussed elsewhere herein, indicates how obfuscatedPrivateKeyDataRandomKey was scrambled and also indicates how to unscramble scrambledObfuscatedKeys to provide obfuscatedPrivateKeyDataRandomKey. The scramble schema can be a list of the values of j. Following the step 412 is a step 414 where the counter, i, is decremented. Following the step 414, control transfers back to the step 404, discussed above, for another iteration.

Figure 5:
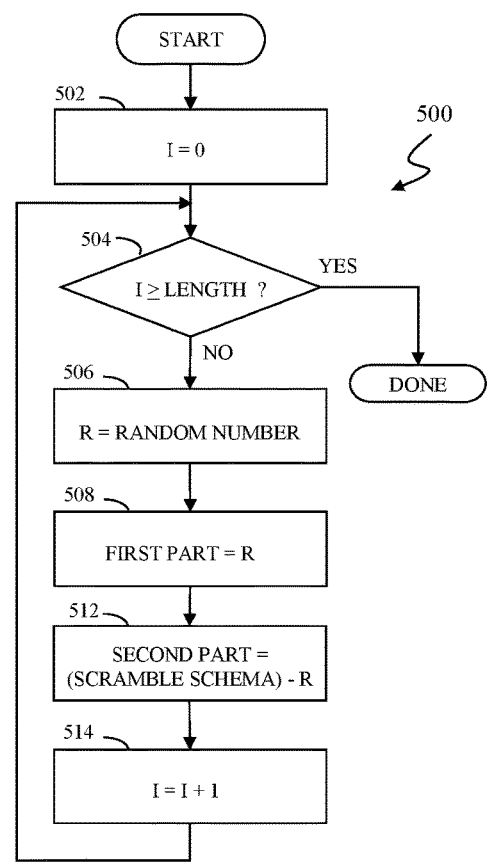
FIG. 5 is a flow diagram illustrating splitting a scramble schema according to an embodiment of the system described herein.

Referring to FIG. 5, a flow diagram 500 illustrates a mechanism for splitting the scrambleSchema at the step 216, discussed above. Of course, the mechanism illustrated by the flow diagram 500 is one of many possible mechanisms that could be used to split the scrambleSchema. Processing begins at a first step 502 where a counter, i, is initialized to zero. The counter i iterates through each block (e.g., byte) of scrambleSchema. Following the step 502 is a test step 504 where it is determined if the counter, i, is greater than or equal to the length of the scrambleSchema. If so, then processing is complete. Otherwise, control transfers from the test step 504 to a step 506 where a random number, r, is generated. In an embodiment herein, r may be constrained to being an integer. Following the step 506 is a step 508 where firstPartScrambleSchema is set equal to r. Following the step 508 is a step 512 where secondPartScrambleSchema is set equal to scrambleSchema−r. Note, therefore, that each block of the scrambleSchema can be reconstructed by adding firstPartScrambleSchema to secondPartScrambleSchema. Following the step 512 is a step 514 where the counter, i, is incremented. Following the step 514, control transfers back to the step 504, discussed above, for another iteration.

The system described herein may be used to securely store any data over and above private key data. The mechanism set forth herein may be extended to more than two entities where the scramble schema and the scrambled encrypted data is split between the more than two entities. The system described herein may be implemented using the any appropriate hardware capable of providing the functionality described herein. Thus, for example, the specific components illustrated herein may be replaced with similar components that provide appropriate functionality. It is also possible to provide additional components without departing from the spirit and scope of the invention.

Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable medium and executed by one or more processors. The computer readable medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

While the invention has been disclosed in connection with various embodiments, modifications thereon will be readily apparent to those skilled in the art. Accordingly, the spirit and scope of the invention is set forth in the following claims.

What is claimed is:

1. A method for securely storing data, the method comprising:
   obfuscating the data using a random key to provide obfuscated data;
   concatenating the random key on to the obfuscated data;
   scrambling the obfuscated data together with the concatenated random key to provide scrambled obfuscated data;
   generating a scramble schema indicating how to unscramble the scrambled obfuscated data;
   encrypting the scrambled obfuscated data to provide encrypted scrambled obfuscated data;
   splitting the scramble schema; and
   distributing separate portions of the scramble schema and separate portions of the encrypted scrambled obfuscated data to separate entities.

2. A method, according to claim 1, wherein the data is private key data.

3. A method, according to claim 1, wherein scrambling the obfuscated data uses a Fisher Yates Shuffle mechanism.

4. A method, according to claim 1, wherein splitting the scramble schema uses a random number and wherein a first part of a portion of the scramble schema is set equal to the random number and a second corresponding part of the portion of the scramble schema is set equal to the difference between the portion of the scramble schema and the random number.

5. A method, according to claim 1, further comprising:
   generating and distributing a symmetric authentication key that is used to authenticate a first one of the entities to a second one of the entities.

6. A method, according to claim 5, wherein the first one of the entities is a user device and the second one of the entities is a key escrow.

7. A method, according to claim 1, wherein each of the separate entities is distributed both a portion of the scramble schema and a portion of the encrypted scrambled obfuscated data.

8. A method, according to claim 1, wherein encrypting the scrambled obfuscated data uses a secret entered by a user.

9. A method, according to claim 1, wherein the scrambled obfuscated data is a shuffled version of a combination of the obfuscated data and the random key.

10. A method for reconstructing data that has been distributed across separate entities, the method comprising:
    authenticating a first one of the entities to a second one of the entities;
    in response to successfully authenticating the first one of the entities to the second one of the entities, transferring a first portion of a scramble schema and a first portion of encrypted scrambled obfuscated data from the second entity to the first entity;
    reconstructing the scramble schema using the first portion of the scramble schema and a second portion of the scramble schema stored at the first entity;
    reconstructing the encrypted scrambled obfuscated data using the first portion of the encrypted scrambled obfuscated data and a second portion of the encrypted scrambled obfuscated data stored at the first entity;
    decrypting the encrypted scrambled obfuscated data to provide scrambled obfuscated data;

unscrambling the scrambled obfuscated data using the scramble schema to provide obfuscated data; and
decrypting the obfuscated data using a random key to provide reconstructed data.

11. A method, according to claim 10, wherein the reconstructed data is private key data.

12. A method, according to claim 10, wherein the random key is concatenated on to the obfuscated data.

13. A method, according to claim 10, wherein the scrambled obfuscated data is unscrambled using a Fisher Yates Shuffle mechanism.

14. A method, according to claim 10, wherein a symmetric authentication key is used to authenticate the first one of the entities to the second one of the entities.

15. A method, according to claim 14, wherein the first one of the entities is a user device and the second one of the entities is a key escrow.

16. A method, according to claim 10, wherein decrypting the scrambled obfuscated data uses a secret entered by a user.

17. A method, according to claim 10, wherein the scrambled obfuscated data is a shuffled version of at least one of the obfuscated data or a combination of the obfuscated data and the random key.

18. A user device for reconstructing data, the user device comprising:

at least one processor coupled to a memory, the memory storing processor executable instructions that configure the at least one processor to:
authenticate the user device with a key escrow server;
in response to successfully authenticating the user device with the key escrow server, cause the user device to request a first portion of a scramble schema and a first portion of encrypted scrambled obfuscated data from the key escrow server;
reconstruct the scramble schema from the first portion of the scramble schema received from the key escrow server and a second portion of the scramble schema stored in the memory;
reconstruct the encrypted scrambled obfuscated data from the first portion of encrypted scrambled obfuscated data received from the key escrow server and a second portion of encrypted scrambled obfuscated data stored in the memory;
decrypt the encrypted scrambled obfuscated data to provide scrambled obfuscated data;
unscramble the scrambled obfuscated data using the scramble schema to provide obfuscated data; and
decrypt the obfuscated data using a random key to provide reconstructed data.

\* \* \* \* \*